United States Patent [19]
Youens

[11] Patent Number: 5,959,833
[45] Date of Patent: Sep. 28, 1999

[54] PORTABLE COMPUTER WITH REVERSE DRAFT ON FRONT SIDE EDGE PORTION OF DISPLAY HOUSING

[75] Inventor: John E. Youens, Magnolia, Tex.

[73] Assignee: Compaq Computer Corporation, Houston, Tex.

[21] Appl. No.: 08/884,565

[22] Filed: Jun. 27, 1997

[51] Int. Cl.⁶ .................................. G06F 1/16; H05K 5/02
[52] U.S. Cl. .......................... 361/681; 361/683; D14/113
[58] Field of Search ..................................... 361/679, 681, 361/683; D14/100, 102, 104, 106, 113; 364/708.1; 248/917, 919, 923

[56] References Cited

U.S. PATENT DOCUMENTS

| | | | |
|---|---|---|---|
| D. 364,387 | 11/1995 | Chiba et al. | D14/106 |
| D. 366,251 | 1/1996 | Rak et al. | D14/106 |
| D. 368,468 | 4/1996 | Kobayashi | D14/100 |
| D. 371,767 | 7/1996 | Faranda et al. | D14/106 |
| 5,724,224 | 3/1998 | Howell et al. | 361/680 |

*Primary Examiner*—Leo P. Picaro
*Assistant Examiner*—Jayprakash N. Gandhi

*Attorney, Agent, or Firm*—Konneker & Smith, P.C.

[57] ABSTRACT

The front side edge of the display lid portion of a notebook computer has a relatively shallow reverse draft angle of approximately five to fifteen degrees thereon and, with the display lid in its downwardly pivoted closed position on the computer's base housing, is rearwardly offset from the front side of the base housing in a manner exposing a relatively narrow front top side surface portion of the base housing. Because of the slight undercut in its front side edge resulting from the reverse draft thereon, the grasping of the front side edge, to upwardly pivot the display lid from its closed position to its open use orientation, is made appreciably easier. Additionally, when the closed computer is viewed from its front side the rearward and downward slope of the front side edge of the lid creates a shadow thereon which serves to highlight the exposed front top side surface portion of the base housing and give the overall housing structure the desirable appearance of being vertically thinner than it actually is. LCD operating lights are placed on the exposed front top side portion of the base housing and are thus visible to the user even when the display lid in its closed orientation.

12 Claims, 1 Drawing Sheet

PORTABLE COMPUTER WITH REVERSE DRAFT ON FRONT SIDE EDGE PORTION OF DISPLAY HOUSING

BACKGROUND OF THE INVENTION

1. Field of the Invention

The present invention generally relates to computer apparatus and, in a preferred embodiment thereof, more particularly relates to the configuration of housings for portable computers such as notebook computers.

2. Description of Related Art

In recent years the notebook computer has made considerable gains in both popularity and technical sophistication. One factor contributing to the increasing popularity of the notebook computer is its ever decreasing size and weight, a factor arising from the ability to fabricate various components of the computer in smaller sizes while, in many cases, increasing the power and/or operating speed of such computers.

These ever-shrinking components in the modern notebook computer are typically carried in a protective outer housing structure that comprises a rectangular base or CPU housing in which the primary computer components, such as the processor, memory and drives, are carried, and a lid or display housing which is pivotally connected to the base housing for movement relative thereto between open and closed positions and carries a display screen on its front or inner side.

The portable computer housing structure, in its closed orientation, has three dimensions which can potentially be reduced to reduce its overall size in conjunction with the size reduction of its internal components—the housing structure's horizontal length and width, and its vertical depth or thickness. Due to practical minimum size limitations for the keyboard and display screen portions of modern notebook computers, the horizontal lengths and widths of their overall housing structures have proven difficult to shorten. This leaves the depth of the housing structure as a potential dimension which can be reduced to reduce the overall housing volume as new techniques for reducing the sizes of its internal components are developed. Flowing from housing depth design are two problems to which the present invention is addressed.

One problem that arises from reducing the thickness of the display housing portion of a notebook computer is that it can become increasingly difficult for a user to grasp its front edge to pivot it upwardly from its closed position to its use orientation in which the lid-mounted display screen faces the user.

Another problem relating to the design goal of reducing the overall housing structure vertical thickness is that while the individual electronic components required in a notebook computer are becoming smaller, notebook computer users are becoming increasingly sophisticated and, in many instances, are demanding that the notebook computer more closely resemble a desktop computer with respect to its power and speed, its display screen image sharpness, its multimedia capabilities, and the total number of computing and other tasks that it can perform.

This growing user preference for increased power, speed and computing capabilities in the notebook computer can easily offset the housing structure size reduction capabilities afforded by smaller electronic components and circuitry and actually require that the overall housing structure vertical thickness be at least somewhat increased. Yet at the same time, users and potential purchasers of notebook computers tend to associate a well designed unit by the thinness of its housing. Accordingly, a purchaser may potentially prefer one notebook computer which appears to have a thinner housing over another notebook computer which has superior performance but an apparently thicker housing.

SUMMARY OF THE INVENTION

In carrying out principles of the present invention, in accordance with a preferred embodiment thereof, an electronic device, representatively a portable notebook computer, is provided with a specially designed housing structure. The housing structure comprises a base housing having a top side, a bottom side spaced apart from the top side, and a front side extending between the top and bottom sides; and a lid housing secured to a rear portion of the base housing for pivotal movement relative thereto between a closed position in which the lid housing extends along and generally parallel to the top side of the base housing, and an open position in which the lid housing is swung upwardly away from the top side of the base housing.

According to a key aspect of the present invention, a side edge portion of the lid housing, preferably its front side edge, is undercut. In a preferred embodiment of the computer, with the lid housing in its closed position the undercut front side edge portion of the lid housing (1) is rearwardly offset from the front side of the base housing in a manner exposing a front top side surface portion of the base housing, (2) facilitates the manual engagement and lifting of the front side edge portion to open the lid housing, and (3) creates a shadow on the front side edge portion of the lid housing which contrasts with the exposed front top side surface portion of the base housing in a manner which, when the portable computer is viewed from the front, contrasts with the exposed front top side surface portion of the base housing in a manner decreasing the apparent visual vertical thickness of the portable computer.

Preferably, the undercut front side edge portion of the lid housing has a generally planar configuration and, with the lid housing in its closed position and the base housing top side facing upwardly, slopes in a downward and rearward direction at a negative draft angle within the approximate range of from five degrees to fifteen degrees.

According to another aspect of the invention, the exposed front top side surface portion of the base housing is representatively used to provide another advantage by mounting thereon an electronic component, illustratively an LED indicating light, which is visible even with the lid housing in its closed orientation.

DETAILED DESCRIPTION

Figure 1:
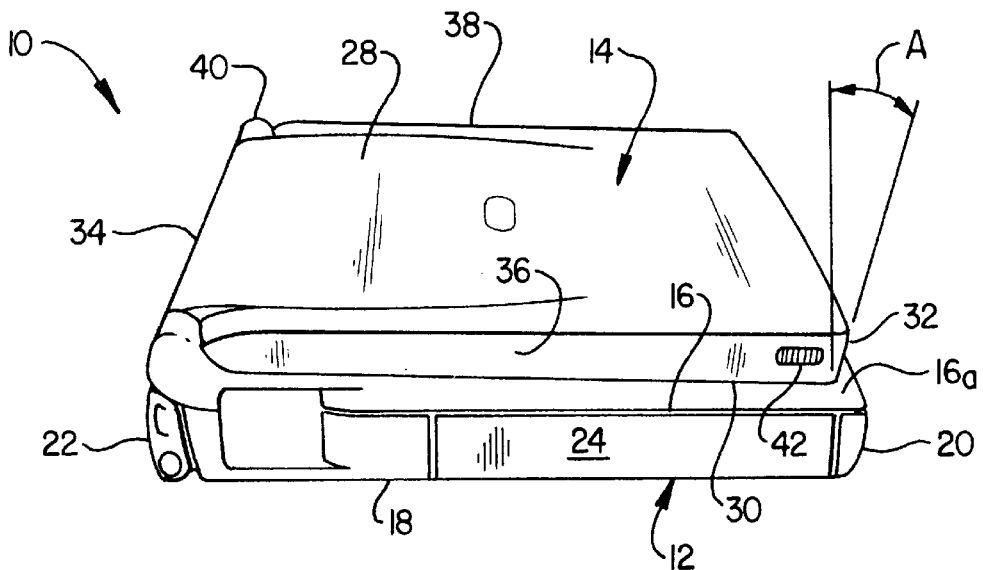
FIG. 1 is a simplified left end perspective view of a representative notebook computer which embodies principles of the present invention.
Figure 2:
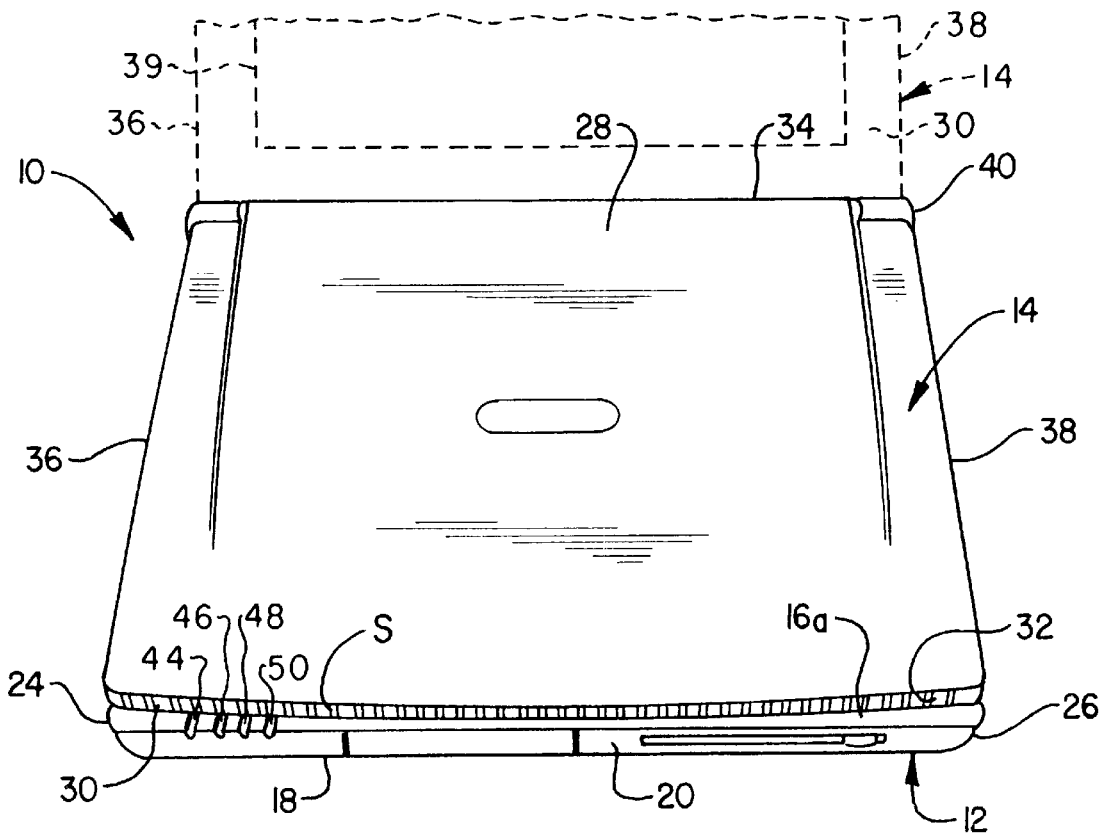
FIG. 2 is an enlarged scale simplified top front side perspective view of the notebook computer.

Perspectively illustrated in FIGS. 1 and 2 is an electronic device, representatively a notebook computer 10, which embodies principles of the present invention. Computer 10 has a generally rectangular base or CPU housing 12, and a thinner rectangular display lid housing 14. Base housing 12 has top and bottom sides 16 and 18, front and rear sides 20 and 22, and left and right ends 24 and 26. A suitable keyboard structure (not shown) is operatively mounted on the top side 16 of the base housing 12.

The display lid housing 14 has a top or outer side 28, a bottom or inner side 30, front and rear side edges 32 and 34; and left and right side edges 36 and 38. A display screen 39 is mounted on the inner side 30 of the lid housing. A suitable hinge mechanism 40 connects a rear side edge portion of the lid housing 14 to a corresponding rear side edge portion of the base housing 12 in a manner permitting the lid housing 14 to be pivotally moved relative to the base housing 12 between (1) a closed position (shown in solid lines in FIGS. 1 and 2) in which the lid housing 14 extends across and substantially covers the top side 16 of the base housing 12, and (2) an upwardly pivoted open use position (partially shown schematically in phantom in FIG. 2) in which the lid housing 14 is generally vertically oriented and exposes its display screen 39 and the base housing's keyboard structure.

Suitable latch means are provided for releasably holding the lid housing 14 in its indicated closed orientation. These latch means representatively include a pair of movable exterior latch members 42 positioned on front portions of the left and right sides 36, 38 of the lid housing 14.

According to key features of the present invention, the front side edge 32 of the lid housing 14 (in its illustrated closed orientation) is undercut, preferably by sloping it downwardly and rearwardly at a relatively small negative draft angle A of approximately five to fifteen degrees, and is rearwardly offset from the front side 20 of the base housing 12 in a manner leaving a relatively narrow front top side surface portion 16a of the top base housing side 16 exposed.

This undercutting of the front lid housing side edge 32 makes it easier for a user of the computer 10 to manually engage a front edge portion of the lid housing 14, unlock the latch means by appropriately moving the latch members 42, and pivot the closed lid housing 14 upwardly to its open use orientation. Such opening of the lid housing 14 may be accomplished by the user placing his thumbs in opposite end portions of this undercut area of the lid housing 14, using his index fingers to appropriately move the latch members 42, and then pushing the front edge of the lid housing 14 upwardly with his thumbs.

As can best be seen in FIG. 2, when the closed computer 10 is viewed from the front, and with a suitable light source conventionally illuminating the computer from above as in a home, office or store, due to the negative draft of the front lid housing edge surface 32 a horizontally elongated shadow S is formed along the undercut front side edge surface 32. The horizontally elongated shadow S is positioned immediately rearwardly of the horizontally elongated, exposed and unshadowed front top side surface area 16a of the base housing 12. This sharp contrast between the dark shadow S and the much lighter forwardly adjacent unshadowed base housing top side surface area 16a provides the overall computer housing structure 12, 14 with a visually apparent vertical thickness which is appreciably thinner than its actual thickness. This, in turn, renders the computer 10 more aesthetically desirable to users and potential purchasers that consider housing thinness a desirable design attribute of a notebook computer.

The rearward offsetting of the front lid housing side edge 32 relative to the front side 20 of the base housing 12 which exposes the top front base housing side surface portion 16a is also used in the present invention to provide another advantage by mounting LED indicating lights 44, 46, 48 and 50 on the exposed surface area 16a so that they are visible even with the lid housing 14 closed as indicated in FIG. 2.

Representatively, these indicating lights 44, 46, 48 and 50 are respectively a hard drive access indicating light, a floppy drive access indicating light, a power indicating light, and a battery charging light. Other electronic operating indicia or control apparatus may be mounted on the exposed base housing front top side surface area 16a in addition to or in place of these indicating lights if desired.

While these features of the present invention have been representatively illustrated as being incorporated in a notebook computer, it will be readily appreciated by those of skill in this particular art that they could also be incorporated in the housings of other types of lidded electronic devices such as, for example, calculators, personal data assistants, and other types of portable computers.

Additionally, while the negative draft, undercut lid housing area described above is formed on the front side edge 32 of the lid housing 14, similar undercut areas could be formed on its left and right side edges 36 and 38, in addition to the front side edge undercut area or in place thereof, if desired. Moreover, while a single rearwardly and downwardly sloping negative draft surface on the lid housing front side surface is preferred, the undercut area could have other configurations if desired such as a generally rectangular undercut area having a generally horizontal top surface and a generally vertical inner side surface.

The foregoing detailed description is to be clearly understood as being given by way of illustration and example only, the spirit and scope of the present invention being limited solely by the appended claims.

What is claimed is:

1. An electronic device having a housing comprising:
    a base section having a top side, a bottom side spaced apart from said top side, and a peripheral side portion extending between said top and bottom sides; and
    a lid section secured to said base section for movement relative thereto between a closed position in which said lid section extends along and generally parallel to said top side of said base section, and an open position in which said lid section is moved away from said top side of said base section, said lid section having an outer side edge portion which, with said lid section in said closed position thereof, is inset from said peripheral side portion in a manner exposing, from above, a top side surface portion of said base section positioned between said outer side edge portion of said lid section and said peripheral side portion of said base section,
    said outer side edge portion of said lid section, when said lid section is in said closed position thereof, being configured to create a shadow thereon which contrasts with the exposed top side surface portion of said base section in a manner decreasing the apparent visual vertical thickness of said housing adjacent said exposed top side surface portion of said base section.

2. The electronic device of claim 1 wherein said electronic device is a portable computer.

3. The electronic device of claim 2 wherein said portable computer is a notebook computer.

4. The electronic device of claim 1 wherein said outer side edge portion of said lid section has an undercut configuration.

5. A portable computer comprising:
    a base housing having a top side, a bottom side spaced apart from said top side, and a front side extending between said top and bottom sides; and
    a lid housing secured to a rear portion of said base housing for pivotal movement relative thereto between a closed position in which said lid housing extends along and generally parallel to said top side of said base housing, and an open position in which said lid housing is swung upwardly away from said top side of said base housing, said lid housing having an undercut front side edge portion which, with said lid housing in said closed position thereof, (1) is rearwardly offset from said front side of said base housing in a manner exposing, from above, a front top side surface portion of said base housing, (2) facilitates the manual engagement and lifting of said front side edge portion to open said lid housing, and (3) creates a shadow on said front side edge portion which contrasts with the exposed front top side surface portion of said base housing in a manner which, when said portable computer is viewed from the front, contrasts with the exposed front top side surface portion of said base housing in a manner decreasing the apparent visual vertical thickness of said portable computer.

6. The portable computer of claim 5 wherein said undercut front side edge portion of said lid housing has a generally planar configuration.

7. The portable computer of claim 6 wherein, with said lid housing in said closed position thereof and said top side of said base housing facing upwardly, said undercut front side edge portion of said lid housing slopes in a downward and rearward direction.

8. The portable computer of claim 7 wherein said undercut front side edge portion of said lid housing slopes downwardly and rearwardly at a negative draft angle within the approximate range of from five degrees to fifteen degrees.

9. The portable computer of claim 5 further comprising an electronic component carried by said base housing and having an external portion disposed on the exposed front top side surface portion of said base housing so as to be visible when said lid housing is in said closed position thereof.

10. The portable computer of claim 9 wherein said electronic component is an indicator light.

11. The portable computer of claim 5 wherein said portable computer is a notebook computer.

12. The electronic device of claim 4 wherein said outer side edge portion of said lid section slopes downwardly and away from said peripheral side portion of said base section.

* * * * *